US009578041B2

(12) United States Patent
Holtmanns et al.

(10) Patent No.: US 9,578,041 B2
(45) Date of Patent: Feb. 21, 2017

(54) VERIFICATION OF PEER-TO-PEER MULTIMEDIA CONTENT (75) Inventors: Silke Holtmanns, Klaukkala (FI); Jan Ignatius, Espoo (FI)

(73) Assignee: Nokia Technologies Oy, Espoo (FI)

( * ) Notice: Subject to any disclaimer, the term of this patent is extended or adjusted under 35 U.S.C. 154(b) by 137 days.

(21) Appl. No.: 12/911,406

(22) Filed: Oct. 25, 2010

(65) Prior Publication Data

US 2012/0102315 A1 Apr. 26, 2012

(51) Int. Cl.
*H04L 29/06* (2006.01)
*H04L 29/08* (2006.01)

(52) U.S. Cl.
CPC ............ *H04L 63/126* (2013.01); *H04L 63/06* (2013.01); *H04L 67/1074* (2013.01); *H04L 2463/061* (2013.01)

(58) Field of Classification Search
USPC ................. 709/250, 232, 212; 713/150, 153
See application file for complete search history.

(56) References Cited

U.S. PATENT DOCUMENTS

| 7,266,198 | B2 * | 9/2007 | Medvinsky ................... 380/200 |
| 7,558,965 | B2 * | 7/2009 | Wheeler et al. .............. 713/186 |
| 8,015,211 | B2 * | 9/2011 | Marceau et al. .............. 707/802 |
| 8,028,159 | B2 * | 9/2011 | Li ................................. 713/150 |
| 2003/0161476 | A1 * | 8/2003 | Fransdonk .................... 380/282 |
| 2003/0163702 | A1 * | 8/2003 | Vigue et al. .................. 713/176 |
| 2004/0030651 | A1 * | 2/2004 | Kim ........................ G06F 21/10 705/51 |
| 2005/0215235 | A1 * | 9/2005 | Masuda ....................... 455/412.1 |
| 2006/0272032 | A1 * | 11/2006 | Jogand-Coulomb ... G06F 21/10 726/30 |
| 2007/0118735 | A1 * | 5/2007 | Cherrington et al. ......... 713/155 |
| 2007/0245152 | A1 * | 10/2007 | Pizano et al. ................. 713/186 |
| 2008/0039058 | A1 * | 2/2008 | Ray ............................. 455/414.3 |
| 2008/0092211 | A1 * | 4/2008 | Klemets et al. .................. 726/3 |
| 2008/0294560 | A1 | 11/2008 | Holtmanns et al. |

(Continued)

FOREIGN PATENT DOCUMENTS

CN 101183938 A 5/2008
CN 101854381 A 10/2010
(Continued)

OTHER PUBLICATIONS

Sirivianos, Michael et al., "Dandelion: Cooperative Content Distribution with Robust Incentives," 2007 USENIX Annual Technical Conference, pp. 157-170.

(Continued)

*Primary Examiner* — Mohamed Wasel
*Assistant Examiner* — Tsung Wu
(74) *Attorney, Agent, or Firm* — Locke Lord LLP (57) ABSTRACT A method includes receiving, at a first wireless device, from a second wireless device, content and an identification of the second wireless device, over a peer-to-peer wireless communication link. The received content is rendered and verification information containing the identification of the second wireless device and an identification of the received content is generated at the first wireless device. The verification information is then encrypted at the first wireless device using an encryption key. Apparatus and a computer program product counterparts to the method are also disclosed.

21 Claims, 6 Drawing Sheets (56) References Cited

U.S. PATENT DOCUMENTS

| | | | |
|---|---|---|---|
| 2008/0320300 A1* | 12/2008 | Gkantsidis et al. | 713/158 |
| 2009/0025061 A1* | 1/2009 | Kravitz | 726/4 |
| 2009/0038016 A1* | 2/2009 | Epstein | G11B 20/00086 726/27 |
| 2010/0151865 A1* | 6/2010 | Camp, Jr. | H04W 72/046 455/445 |
| 2010/0190500 A1* | 7/2010 | Choi et al. | 455/436 |
| 2010/0211608 A1* | 8/2010 | Dolganow et al. | 707/803 |
| 2010/0250917 A1* | 9/2010 | Marivoet et al. | 713/150 |
| 2010/0293382 A1* | 11/2010 | Hammad | 713/173 |

FOREIGN PATENT DOCUMENTS

| | | |
|---|---|---|
| WO | WO2007024970 | 3/2007 |
| WO | WO2008155713 | 12/2008 |

OTHER PUBLICATIONS

Technical Report—3rd Generation Partnership Project; Technical Specification Group Services and System Aspects; Study on IMS based peer-to-peer content distribution services (Release 11), 3GPP TR 22.906, vol. 11.0.0, Jun. 2010, pp. 1-15.

International Search Report of International App. No. PCT/FI2011/050850—Date of Completion of Search: Dec. 30, 2011, 6 pages.

Written Opinion of the International Searching Authority for International App. No. PCT/FI2011/050850—Date of Completion of Opinion: Dec. 30, 2011, 6 pages.

Sirivianos, M., et al., "Robust and Efficient Incentives for Cooperative Content Distribution", IEEE/ACM Transactions on Networking, vol. 17, No. 6, Dec. 2009, pp. 1766-1779.

Skevik, K., et al., "Evaluation of a comprehensive P2P video-on-demand streaming system", Computer Networks, 53, 2009, pp. 434-455.

Wierzbicki, A., "Peer-to-peer Direct Sales", IEEE Computer Society, Proceeding of the Fifth IEEE International Conference on Peer-to-Peer Computing, 2005, 8 pages.

English Language Machine Translation of Chinese Patent Application Publication No. CN101183938A, 9 pages.

English Language Machine Translation of Chinese Patent Application Publication No. CN101854381A, 17 pages.

\* cited by examiner

VERIFICATION OF PEER-TO-PEER MULTIMEDIA CONTENT

TECHNICAL FIELD

The present invention generally relates to verification and interaction between peers with regard of the usage of the peer-to-peer multimedia content. The invention relates particularly, though not exclusively, to generating verification information for peer-to-peer content distribution of the multimedia content.

BACKGROUND ART

The development of fixed and mobile broadband technologies and more powerful mobile handsets have boosted popular usage of content distribution services on mobile handsets.

Mobile broadcast solutions have been standardized by different organizations, such as the 3rd generation partnership project (3GPP) multimedia broadcast/multicast service (MBMS). 3GPP multimedia broadcast/multicast service (MBMS) enables resource-efficient delivery of multimedia content to the mobile users. A multimedia broadcast/multicast service (MBMS) client can receive content via download delivery, streaming delivery, a combination of streaming delivery and download delivery, and/or other delivery methods.

Multimedia broadcast/multicast service (MBMS) is a 3GPP Release 6 (Rel-6) feature, which may be deployed by network operators where it is cost efficient to have the broadcast/multicast distribution of content. When multimedia broadcast/multicast service (MBMS) subscribers move to other areas, where there is no multimedia broadcast/multicast service (MBMS) coverage, the network operator may distribute the multimedia broadcast/multicast service (MBMS) content in a unicast mode.

Multimedia broadcast/multicast service (MBMS) introduces the concept of a point-to-multipoint service into a 3GPP system. A requirement of a multimedia broadcast/multicast service (MBMS) user service is to be able to securely transmit data to a given set of users. In order to achieve this, there needs to be a method of authentication, key distribution and data protection for a multimedia broadcast/multicast service (MBMS) user service. This means that multimedia broadcast/multicast service (MBMS) security is specified to protect multimedia broadcast/multicast service (MBMS) user services, and it is independent on whether multicast or broadcast mode is used. A similar concept is used by the Open Mobile Alliance (OMA) in their OMA Broadcast specifications.

With the explosive growth of media content consumption, the number of media servers to provide streaming services is required to be increased almost linearly with the number of users. In addition, centralized streaming media servers require considerable demands towards the bandwidth of the backbone IP network. So it is required to deploy more and more edge servers close to user equipments (UE) to guarantee service quality with the increasing number of users.

Peer-to-peer (P2P) technology can be used between edge servers and user equipments (UE) to relieve the above problem with regard to coverage area and network load. Not only the edge servers handle the requests from its locally served user equipments (UE), but also they can handle the requests transferred from the neighboring edge servers. Similarly, if the user equipment's (UE) capabilities permit, the user equipment (UE) can offer spare uplink bandwidth and storage space while obtaining data, and uploads data to other requested destinations. Content is transmitted in a segmented manner, and most of the traffic can be spread across the edge of the network, which helps reduce the storage and bandwidth demands of centralized servers. Therefore, the system capability is improved along with the increasing number of edge servers and user equipments (UE). To utilize peer-to-peer (P2P) technology efficiently, a proper interaction between the peers is needed. Such interaction can be controlled by the network but a user may have verification for participating in the peer-to-peer (P2P) content distribution.

SUMMARY

According to a first example aspect of the invention there is provided a method comprising:
  receiving, at a first entity, from a second entity, content and an identification of the second entity, over a peer-to-peer communication link;
  rendering the received content;
  generating, in response to the rendering of the received content, verification information containing at least:
    the identification of the second entity; and
    an identification of the received content; and encrypting the verification information using an encryption key.

The method may further comprise sending, by the first entity, a request for content before receiving the content from the second entity; and sending, by the first entity, the encrypted verification information for the second entity. The content may comprise at least one of the following: multimedia information, file download, real-time streaming data and software.

The method may further comprise checking, at the first entity, a credential of the second entity from the content before rendering the content. The method may further comprise checking, at the first entity, an operator signature of the content before rendering the content.

The method may further comprise signing the content using a signature, when the content is created by an operator. The signature may be an operator public key.

The encryption key may be a first entity specific symmetric key. The first entity specific symmetric key may be at least one of the following multimedia broadcast/multicast service keys: user key, request key, service key and traffic key. The identification of the second entity may be at least one of the following multimedia broadcast/multicast service keys: user key, request key, service key and traffic key. The user key may be derived from a ciphering key and an integrity key.

The method may further comprise receiving the content, at the second entity, from a content server of an operator before sending the content to the first entity.

The method may further comprise sending, by the first entity, the encrypted verification information to an operator for verification of the content transfer and usage. The method may further comprise providing a credential for the second entity. The method may further comprise sending, by the first entity, the encrypted verification information to the second entity for verification of the content transfer and usage. The method may further comprise generating a credential value for the second entity and including the credential value, at the second entity, to the content sent to the first entity. The generated credential value may be signed using an operator signature.

According to a second example aspect of the invention there is provided an apparatus comprising:
- at least one processor; and
- at least one memory including computer program code, the at least one memory and the computer program code being configured to, with the at least one processor, cause the apparatus at least to perform:
  - receive the content and an identification of a peer entity, over a peer-to-peer communication link;
  - render the received content;
  - generate verification information, in response to the rendering of the received content, containing at least:
    - the identification of the second entity; and
    - an identification of the received content; and
  - encrypt the verification information using an encryption key.

According to a third example aspect of the invention there is provided a computer program embodied on a computer readable medium comprising computer executable program code which, when executed by at least one processor of an apparatus, causes the apparatus to perform:
- receive the content and an identification of the peer entity, over a peer-to-peer communication link;
- render the received content;
- generate, in response to the rendering of the received content, verification information containing at least:
  - the identification of the peer entity; and
  - an identification of the received content; and
- encrypt the verification information using an encryption key.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
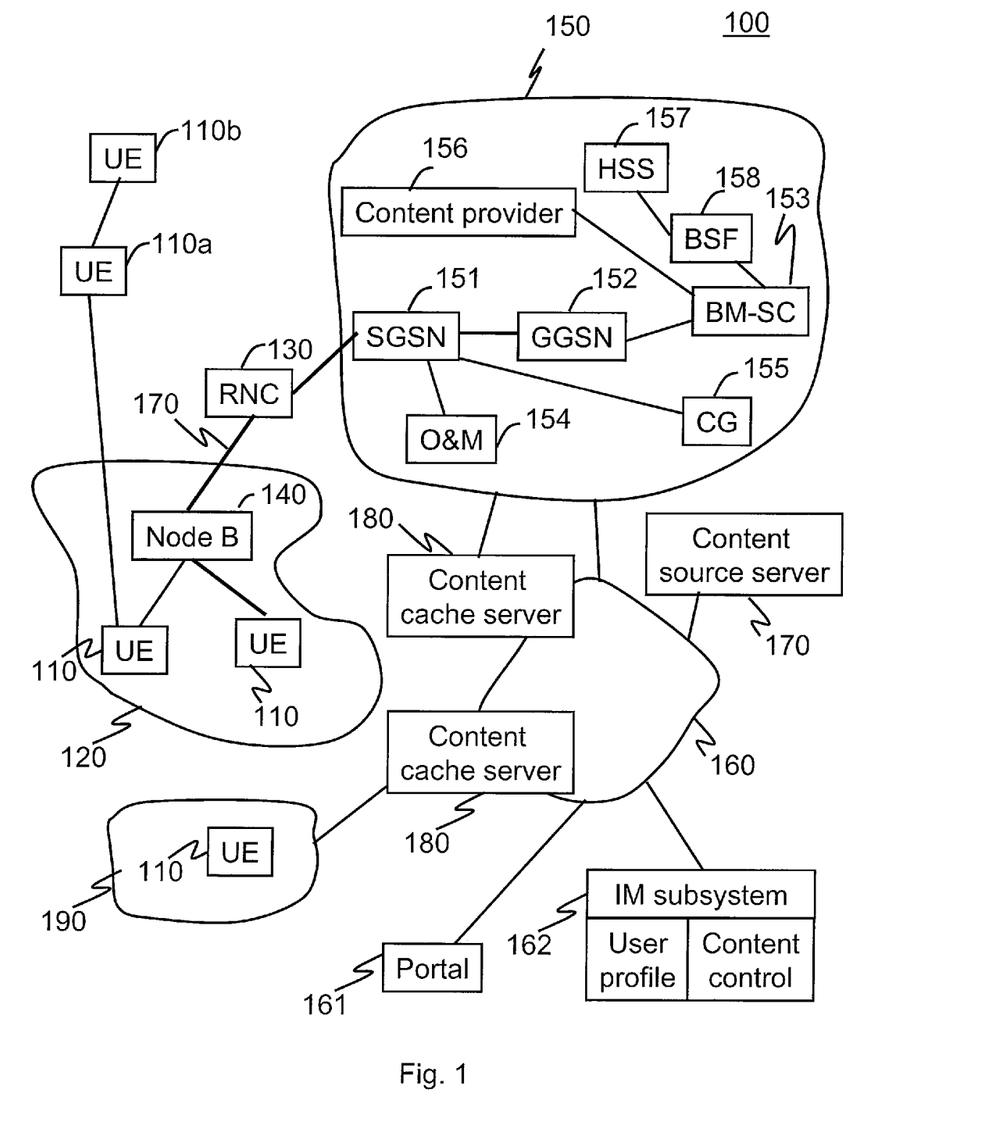
FIG. 1 shows some details of the system architecture.

FIG. 1 shows some details of the Internet multimedia system (IMS) architecture 100 in accordance with an example embodiment of the invention. A typical 3GPP radio access system UTRAN (UMTS terrestrial radio access network) for implementing the multimedia broadcast/multicast service (MBMS) has a basic architecture as is illustrated in FIG. 1. FIG. 1 depicts a plurality of user equipment (UE) 110, within a predetermined service area 120 such as a cell, a plurality of radio network controllers (RNC) 130, a plurality of base stations (Node B) 140, a core network 150, a serving GPRS support node (SGSN) 151, a gateway GPRS support node (GGSN) 152, a broadcast-multicast service centre (BM-SC) 153, an operation and maintenance (O&M) workstation or server 154, a charging gateway (CG) 155, a generic bootstrapping server function (BSF) 158 and a content provider or multicast broadcast source 156. As can be seen in FIG. 1, two user equipments (UE) 110a, 110b are located outside the service area 120 without connection to the radio network controller 130. However, such user equipments (UE) 110a, 110b may be connected to other user equipments (UE) 110 over peer-to-peer (P2P) connection. Peer-to-peer (P2P) connections may also be established between user equipments (UE) 110 that are connected to the radio network controller (RNC) 130. Peer-to-peer (P2P) connections may also be established between network elements.

The user equipments (UE) 110 may move in and out of a network service area offering good service coverage. When the user equipment (UE) 110 moves to the edge of the network service area 120, the moving out may be prepared by the user equipment (UE) 110 and network. When moving out of the service area 120, the user equipment (UE) 110 may provide service information to other user equipments (UE) 110 and request service information from other user equipments (UE) 110.

On delivering multimedia broadcast/multicast service (MBMS) transmissions to numerous user equipments (UE) 110, only one packet data protocol (PDP) context is established as a prerequisite for a packet data transmission connection 170 between a gateway GPRS support nodes (GGSN) 152 and user equipment (UE) 110 via a serving GPRS support node (SGSN) 151. A single, common context suffices for transmission of data within a core network thanks to the point-to-multipoint approach.

A generic bootstrapping server function (BSF) 158 may function as a content security key generating and credential server in the system 100. The generic bootstrapping server function (BSF) 158 and the user equipment (UE) 110 shall mutually authenticate using the authentication and key agreement (AKA) protocol, and agree on session keys that are afterwards applied between user equipment (UE) 110 and a network application function (NAF). Other authentication protocols, such as hypertext transfer protocol (HTTP) digest or session initiation protocol (SIP) digest, may also be used. The network application function (NAF), which is part of the application server (content provisioning server), is a functional module located in the broadcast-multicast service centre (BM-SC) 153. Alternatively, if a legacy smart card (subscriber identity module) is involved, transport layer security (TLS) and legacy authentication is used. Generic bootstrapping architecture (GBA) may also utilize other authentication mechanism, like hypertext transfer protocol (HTTP) digest or session initiation protocol (SIP) digest. Main functions of the network application function (NAF) module are service/user management (e.g., service subscription and unsubscription) and service key management (e.g., service key generation and delivery). The bootstrapping server function (BSF) 158 shall restrict the applicability of the key material to a specific network application function (NAF) by using a key derivation procedure. The key derivation procedure may be used with multiple network application functions (NAF) during the lifetime of the key material. The lifetime of the key material is set according to the local policy of the bootstrapping server function (BSF) 158. The bootstrapping server function (BSF) 158 is allowed to fetch any required authentication information, security information and subscriber profile information from a home subscriber system (HSS) 157. In legacy networks, the bootstrapping server function (BSF) 158 may interact with the home location register (HLR) instead of the home subscriber system (HSS) 157. Alternatively, an authentication-authorization-accounting (AAA) server may be used for providing the needed subscriber data and credentials.

Core network 150 may be connected to internet protocol (IP) network 160. A content server 170 providing multimedia content may be connected to the internet protocol (IP) network 160. Content cache servers 180 may be introduced to the system 100 providing cached multimedia content. Other radio sub-systems may be connected to the content cache servers 180, such as wireless or wired broadband systems 190. Internet multimedia system (IMS) 100 may also comprise a portal 161.

User equipments (UE) 110 may initiate a content distribution service via fixed or mobile access network to internet multimedia subsystem 162. User equipment (UE) 110 will be redirected to the portal 161, which offers content indexing, browsing and searching functionalities. The content is usually stored on content source servers 170 (e.g. network entities or user equipments) and content cache servers 160 are deployed close to the users to accelerate content distribution. User profiles may be stored in the internet multimedia subsystem 162 as well as terminal capabilities (e.g. processing capabilities, screen size). After user equipments (UE) 110 request content distribution services, user profile of the internet multimedia subsystem 162 may provide the service. User preferences and terminal capabilities may be used to decide whether the client is capable of receiving the requested content. Content control of the internet multimedia subsystem 162 may be used to control the content distribution in the network and to define the source for the requested content.

Figure 2A:
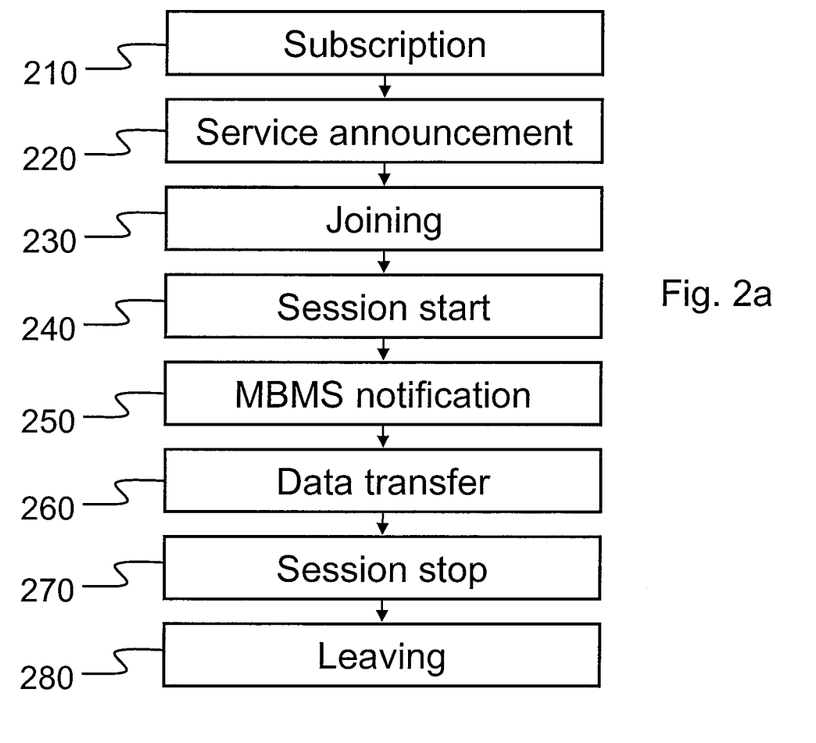
FIG. 2a shows different phases of the multimedia broadcast/multicast service (MBMS) multicast provision.

FIG. 2a shows different phases 210 to 280 of the multimedia broadcast/multicast service (MBMS) multicast content provision, such as mobile television. The phases subscription 210, joining 220 and leaving 280 may be performed individually per user. The other phases may be performed for a service and thus for all users interested in the related service. The sequence of phases may repeat, depending for example on the need to transfer data. In addition, subscription 210, joining 230, leaving 280, service announcement 220 as well as multimedia broadcast/multicast service (MBMS) notification 250 may run in parallel to other phases or in different order. For example, service subscription 210 may be done anytime before or after service announcement 220.

Subscription 210 establishes a relationship between a user and a service provider, which allows the user to receive the related multimedia broadcast/multicast service (MBMS). Service subscription 210 is the agreement of the user to receive service(s) offered by the operator. Subscription information is recorded in the broadcast-multicast service centre (BM-SC) 153, which may act as a network application function (NAF) in generic bootstrapping architecture (GBA). Subscription information and other broadcast-multicast service centre (BM-SC) 153 functionality may be on separate entities. Service announcement 220 may allow users to request or be informed about the range of multimedia broadcast/multicast service (MBMS) user services available. This includes operator specific multimedia broadcast/multicast service (MBMS) user services as well as services from content providers outside of the operator network. Service announcement 220 is used to distribute to users information about the service, parameters required for service activation (e.g. IP multicast address(es)) and possibly other service related parameters (e.g. service start time).

Joining 230 (i.e. multimedia broadcast/multicast service (MBMS) multicast activation by the user) is the process by which a subscriber joins (becomes a member of) a multicast group, i.e. the user indicates to the network that he/she wants to receive multicast mode data of a specific multimedia broadcast/multicast service (MBMS) bearer service. A multimedia broadcast/multicast service (MBMS) user service may also be carried by more than one multimedia broadcast/multicast service (MBMS) bearer service. In that case, the multimedia broadcast/multicast service (MBMS) user service part in the user equipment (UE) 110 initiates the relevant multimedia broadcast/multicast service (MBMS) bearer services to receive the service. Session start 240 is the point at which the broadcast-multicast service centre (BM-SC) 153 is ready to send data. Session start 240 occurs independently of activation of the service by the user. Certain user may activate the service before or after session start 240. Session start 240 is the trigger for bearer resource establishment for multimedia broadcast/multicast service (MBMS) data transfer. If a multimedia broadcast/multicast service (MBMS) user service is carried by more than one multimedia broadcast/multicast service (MBMS) bearer service, a session start message 240 is sent for each multimedia broadcast/multicast service (MBMS) bearer service. In that case, the user equipment (UE) 11 may need to initiate the reception of multiple relevant multimedia broadcast/multicast service (MBMS) bearer services to receive the multimedia broadcast/multicast service (MBMS) user service.

MBMS notification 250 informs the user equipments (UE) 110 about forthcoming (and potentially about ongoing) multimedia broadcast/multicast service (MBMS) multicast data transfer. Data transfer 260 is a phase when multimedia broadcast/multicast service (MBMS) data is transferred to the user equipment (UE) 110. Session stop 270 is the point at which the broadcast-multicast service centre (BM-SC) 153 determines that there will be no more data to send for some period of time. This period is long enough to justify removal of bearer resources associated with the session. At session stop 270, the bearer resources are released. Leaving 280 (i.e. multimedia broadcast/multicast service (MBMS) multicast deactivation by the user) is the process by which a subscriber leaves (stops being a member of) a multicast group, i.e. the user no longer wants to receive multicast mode data of a specific multimedia broadcast/multicast service (MBMS) bearer service.

Figure 2B:
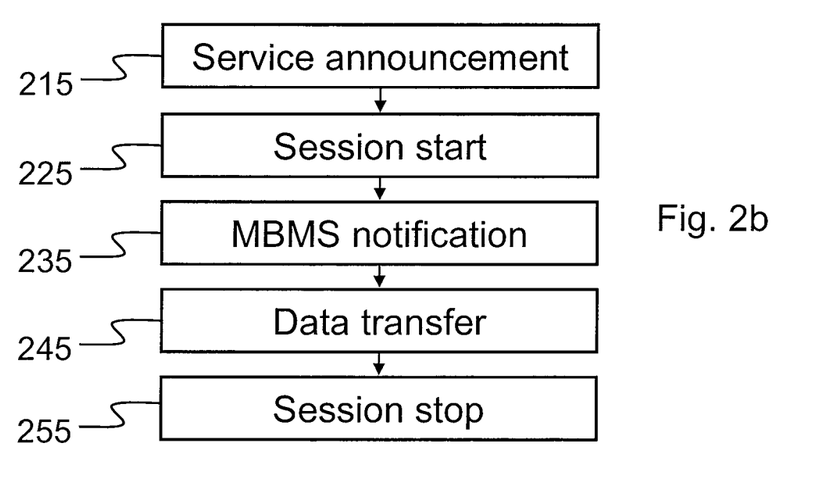
FIG. 2b shows different phases of the multimedia broadcast/multicast service (MBMS) broadcast provision.

FIG. 2b shows different phases 215 to 255 of the multimedia broadcast/multicast service (MBMS) broadcast provision. The sequence of phases 215 to 255 may repeat, e.g. depending on the need to transfer data. It is also possible that the service announcement 215 and MBMS notification 235 phase may run in parallel with other phases, in order to inform user equipments (UE) 110, which have not yet received the related service. Service announcement 215 informs user equipments (UE) 110 about forthcoming multimedia broadcast/multicast service (MBMS) user services. The multimedia broadcast/multicast service (MBMS) user service part in the user equipment (UE) 110 initiates reception of the multimedia broadcast/multicast service (MBMS) bearer service to receive a multimedia broadcast/multicast service (MBMS) user service. In case one multimedia broadcast/multicast service (MBMS) user service is carried by more than one multimedia broadcast/multicast service (MBMS) bearer service, the user equipment (UE) 110 may need to initiate the reception of multiple relevant multimedia broadcast/multicast service (MBMS) bearer services to receive the multimedia broadcast/multicast service (MBMS) user service. Session start 225 is the point at which the broadcast-multicast service centre (BM-SC) 153 is ready to send data. Session start 225 is the trigger for bearer resource establishment for multimedia broadcast/multicast service (MBMS) data transfer. If a multimedia broadcast/multicast service (MBMS) user service is carried by more than one multimedia broadcast/multicast service (MBMS) bearer service, a session start 225 message is sent for each multimedia broadcast/multicast service (MBMS) bearer service. In that case, the user equipment (UE) 110 may need to initiate the reception of multiple relevant multimedia broadcast/multicast service (MBMS) bearer services to receive the multimedia broadcast/multicast service (MBMS) user service.

MBMS notification 235 informs the user equipments (UE) 110 about forthcoming (and potentially about ongoing) multimedia broadcast/multicast service (MBMS) broadcast data transfer. Data transfer 245 is the phase when multimedia broadcast/multicast service (MBMS) data is transferred to the user equipments (UE) 110. Session stop 255 is the point at which the multimedia broadcast/multicast service (MBMS) user service determines that there will be no more data to send for some period of time. This period is long enough to justify removal of bearer resources associated with the service. At session stop 255, the bearer resources are released. Session update (not shown) may be used to update specific parameters of an ongoing multimedia broadcast/multicast service (MBMS) broadcast session.

When compared to point-to-point communications, multicast service security faces some specific challenges. In the multimedia broadcast/multicast service (MBMS) context, ciphering has a different purpose, as multimedia broadcast/multicast service (MBMS) subscribers have no real interest in broadcast or multicast privacy. However, encryption is a key feature for operators and content providers, as it is the only way to prevent unauthorized customers from receiving the data for free.

Multimedia broadcast/multicast service (MBMS) security mechanisms like ciphering need to be designed in a way, which is suitable for point-to-multipoint communications. In addition, those mechanisms shall prevent any bypass attempts from subscribers, by exchanging keys or passwords, for example. This is the reason why multimedia broadcast/multicast service (MBMS) security mechanisms are quite specific, involving complex key structures and frequent key updates.

Figure 3:
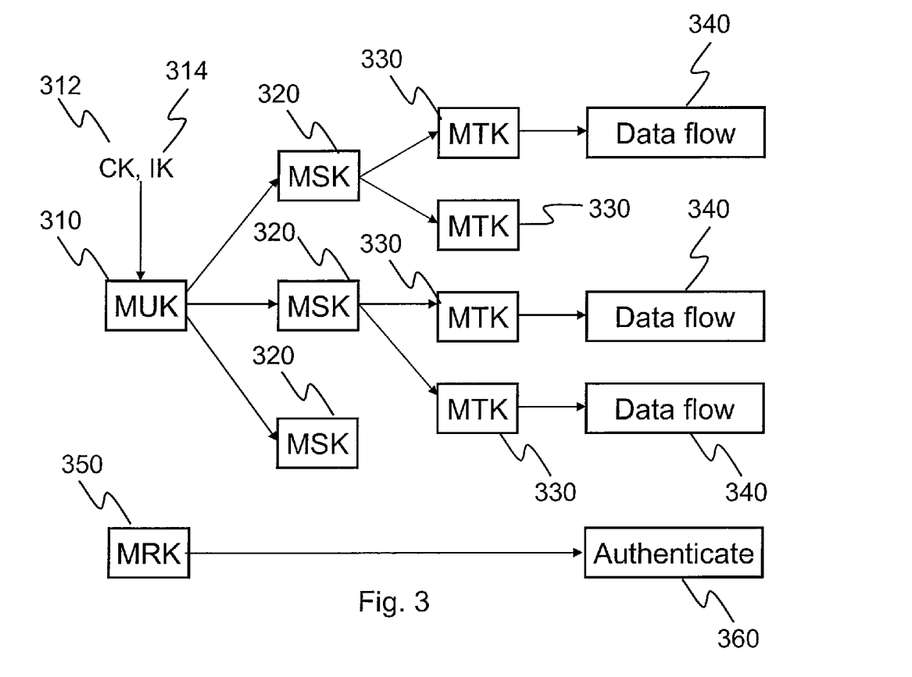
FIG. 3 illustrates key structure of the multimedia broadcast/multicast service (MBMS)

FIG. 3 illustrates key structure of the multimedia broadcast/multicast service (MBMS) security. As opposed to most point-to-point communications, the multimedia broadcast/multicast service (MBMS) security is not applied on a specific part of the transmission path (like the radio segment) but is rather performed end-to-end, between the broadcast-multicast service centre (BM-SC) 153 (content provision server) and the user equipments (UE) 110. The basis of the multimedia broadcast/multicast service (MBMS) security is that the multicast data are protected by a symmetric traffic key (MTK) 330 which is a secret key shared by both the sender (the broadcast-multicast service centre (BM-SC) 153) and the receivers (the multimedia broadcast/multicast service (MBMS) subscribers or user equipments (UE) 110. The symmetric traffic key (MTK) 330 is a short-lived symmetric key, which allows fast content decryption and is not user equipment (UE) specific. At first, each terminal builds its own unique secret user key (MUK) 310, derived from ciphering key (CK) 312 and integrity key (IK) 314. Ciphering key (CK) 312 and integrity key (IK) 314 may be stored in the terminal's universal subscriber identity module (USIM). Those references of ciphering key (CK) 312 and integrity key (IK) 314 are also stored within the home subscriber system (HSS) 157 so that the network can also build its own reference of the user key (MUK) 310. User key (MUK) 310 may also be generated based on sres and Kc instead of ciphering key (CK) 312 and integrity key (IK) 314. Sres is a 32-bit signed response generated by mobile station and a mobile services switching center. Kc is a 64-bit ciphering key used as a session Key for encryption of the over-the-air channel. Kc is generated by the mobile station from the random challenge presented by the global system for mobile communications (GSM) network and the Ki from the subscriber identity module (SIM) utilizing an A8 algorithm. Similar key derivation means can be used in case other authentication protocols are used. Such authentication protocols may comprise session initiation protocol (SIP) digest, hypertext transfer protocol (HTTP) digest or certificate based authentication protocol, for example.

The user key (MUK) 310 is further used by the user equipment (UE) 110 to retrieve the service key (MSK) 320 provided by the broadcast-multicast service centre (BM-SC) 153 during the authorization process. Service key (MSK) 320 and traffic key (MTK) 330 are the actual keys to secure multimedia broadcast/multicast service (MBMS) data. Both keys are generated by the broadcast-multicast service centre (BM-SC) 153. Each traffic key (MTK) 330 corresponds to a unique data flow 340 (either a streaming flow or file download flow) and is used to cipher the data block for this flow. The set of traffic keys (MTK) 330 is transmitted to the authorized subscribers 110 by the broadcast-multicast service centre (BM-SC) 153 in a secured way, protected by the service key (MSK) 320. As a way of enhancing security, it is then possible for the broadcast-multicast service centre (BM-SC) 153 to define two different sets of service key (MSK) 320 (and associated traffic key) and update the traffic key (MTK) 330 during a service or a session by indicating to the authorized receivers 110 the new service key (MSK) 320 to use. Service key (MSK) 320 and traffic key (MTK) 330 are usually updated in a subscribers user equipment (UE) 110 using unsolicited push procedures from the broadcast-multicast service centre (BM-SC) 153. The protocol used to perform this update is multimedia internet keying (MIKEY), which is a key distribution protocol.

If a service employs the multimedia broadcast/multicast service (MBMS) security, this is indicated in the service announcement 215, 220. User equipment (UE) 110 that desires to receive such a service may first use the generic bootstrapping architecture (GBA) to establish a shared secret with the mobile network for application specific purposes. This secret is then passed by the mobile network to the broadcast-multicast service centre (BM-SC) 153. At this point the shared secret is used by both the user equipment (UE) 110 and the broadcast-multicast service centre (BM-SC) 153 to derive two user equipment (UE) 110 specific keys, the multimedia broadcast/multicast service (MBMS) request key (MRK) 350 and the multimedia broadcast/multicast service (MBMS) user key (MUK) 310. The user equipment (UE) 110 then initiates the user service registration procedure with the broadcast-multicast service centre (BM-SC) 153, during which the two parties authenticate 360 each other by using the request key (MRK) 350. If the user equipment (UE) 110 has subscribed to the service, it is registered by the broadcast-multicast service centre (BM-SC) 153 as a key recipient. The user equipment (UE) 110 then performs the service key (MSK) 320 request procedure, asking the broadcast-multicast service centre (BM-SC) 153 for the key of a specific multimedia broadcast/multicast service (MBMS) service. The broadcast-multicast service centre (BM-SC) 153 sends the multimedia broadcast/multicast service (MBMS) Service Key (MSK) to the user equipment (UE) 110 with the service key (MSK) 320 delivery procedure, using the user (MUK) 310 to protect it. The broadcast-multicast service centre (BM-SC) 153 may periodically send a new service key (MSK) 320 to the user equipment (UE) 110 to invalidate older keys. The key hierarchy enables that the user (MUK) 310 is used to protect the service key (MSK) 320, which in turn protects the short-lived traffic key (MTK) 330. If a user unsubscribes from a service, the traffic key (MTK) 330 expires and the user will not receive a new service key (MSK) 320. Hence, future traffic keys (MTK) 330 will not be decryptable by such user.

Challenging situations may exist for the user equipment (UE) 110 relating to the key distribution. One such situation may occur when the user equipment (UE) 110 moves out of the full-covered network coverage of the multimedia broadcast/multicast service (MBMS). User may have started a multimedia broadcast/multicast service (MBMS) session when connected to network providing the multimedia broadcast/multicast service (MBMS) and during the session moving to an area, where the multimedia broadcast/multicast service (MBMS) is not served. Other possibility is that the multimedia broadcast/multicast service (MBMS) is disconnected over a mobile network for some reason and the user cannot re-connect over the mobile network. Typical situation may be when the user is sitting in a train. Critical aspect is how the key management is working when the user is watching a streamed video and getting out of the range of a good coverage area.

In accordance with an example embodiment of the invention, a handover of content distribution services between a mobile network (mobile network operator infrastructure) and a device network may be established. In order to ensure the security aspects of the multimedia broadcast/multicast service (MBMS), the cryptographic key handling needs to be created for the handover procedure. Devices of the device network may comprise for example mobile phones, user equipments (UE), personal digital assistants (PDA), laptop computers or such. The security mode concept for the handover from service-covered area to not covered area may be controlled by the mobile network. The concept enables the mobile apparatus to switch between a remote and a connected security mode. The security mode concept may support both directions of handover, from the mobile network to the device network and vice versa.

In accordance with an example embodiment of the invention, the long-lived user key (MUK) 310 and the request key (MRK) 350 may not be touched due they are dependent on the generic bootstrapping architecture (GBA) and are user specific.

The short-lived traffic key (MTK) 330 is used to always decrypt the actual streaming data 340. When the user equipment (UE) 110 moves from mobile network's server covered mode to device network's peer-to-peer (P2P) mode, some problems may arise. Such problems include that the data chunks may not arrive in the right order or the data may arrive later (and the traffic key (MTK) 330 is no longer valid), for example. In the worst case, even the service key (MSK) 320 might no longer be valid (and received traffic key (MTK) 330 may no longer be decrypted). Additionally, the extension to the key management model should be compatible with the existing model and network operators, who do not wish to deploy the peer-to-peer (P2P) content distribution. The content protected with the traffic key (MTK) 330 should be exchangeable between users described to the same service.

Figure 4A:
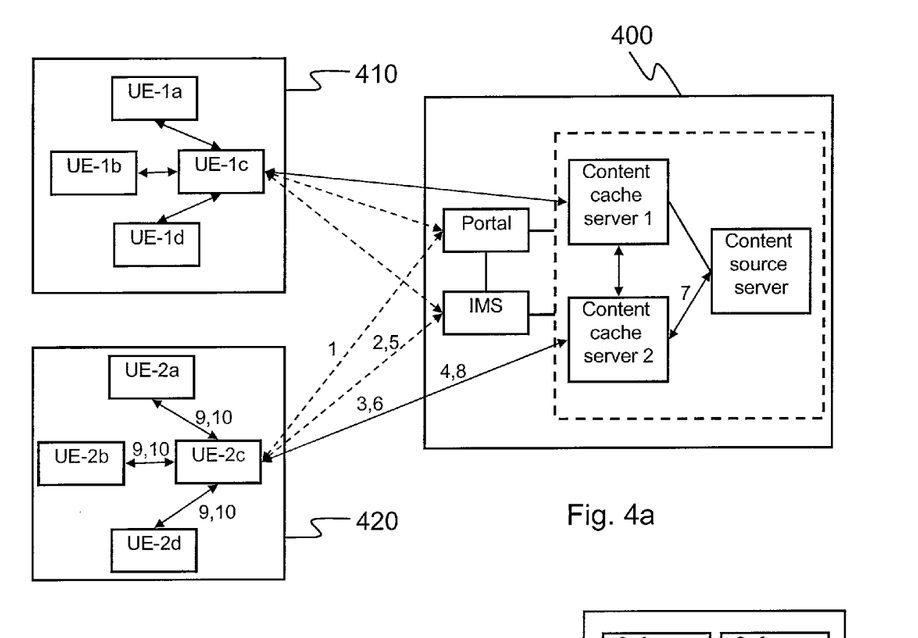
FIG. 4a shows some details of a content-on-demand multimedia download service of an internet multimedia system (IMS), in which various embodiments of the invention may be applied.

FIG. 4a shows some details of a content-on-demand service 400 of an internet multimedia system (IMS), in which various embodiments of the invention may be applied. User equipment UE-2c is an internet multimedia system (IMS) subscriber of operator A, and the user of which wants to view a movie outside a cinema. The user may notice from a pushed advertisement on the internet multimedia system (IMS) client that internet multimedia system (IMS) online movie theatre can provide the movie on demand with a discounted price. Therefore, the user decides to watch it from online movie theatre. Following steps 1 to 10 may take place during the service.

At step 1, the user equipment UE-2c may start an internet multimedia system (IMS) client and begin internet multimedia system (IMS) registration process. After the user equipment UE-2c has finished the registration, the internet multimedia system (IMS) (e.g. a portal) may deliver the program information to the client. The user equipment UE-2c may search and select the movie in the program list of the portal to tell the internet multimedia system (IMS) that "I want to watch the movie".

At step 2, the internet multimedia system (IMS) queries the locations of film storage resources of the movie from the sub-system of internet multimedia system (IMS) as shown earlier in FIG. 1. Internet multimedia system (IMS) may then send back the list of resource locations to the user equipment UE-2c. At the beginning, a content cache server 2 may have some initial parts of the movie (e.g. part 1 and part 2) and the content source server has all parts of it. Therefore, the internet multimedia system (IMS) may inform the user equipment UE-2c that the content cache server 2 has the movie for downloading. The movie may have been segmented into 10 parts beforehand (named in order as part 1, part 2, part 3 and so on). Only part 1 and part 2 of the movie may be downloaded to the content cache server 1, since they are the most frequently viewed parts.

Then the content cache server 2 may obtain part 1 and part 2 from the cache server 1, rather than from the content source server.

At step 3, the user equipment UE-2c may request available parts of the content from content cache server 2. After receiving a response, the user equipment UE-2c may download the first two parts of the movie from the content cache server 2 at step 4 in FIG. 4a. When downloading, the user equipment UE-2c may already begin to watch the movie and rest of the parts of the movie may be retrieved from the content source server.

At step 5, the user equipment UE-2c may update the content information (e.g. which parts currently downloaded) to the internet multimedia system (IMS) and retrieve the latest information of where the movie parts are distributed from the internet multimedia system (IMS) periodically, for example every 2 minutes.

Between steps 6 and 8, more users around the user equipment UE-2c (in domain 420) may join watching the movie and are served by content cache server 2. Users tend to watch the parts that the content cache server 2 does not have and such parts may be retrieved from the content source server. Consequently, the content source server may become congested and the quality of experience for the end users may deteriorate. However, relating to step 5, the users in domain 420 may know that the content cache server 1 has cached rest of the parts of the movie and may serve some of the users. As a result, the workload of the content source server may relieve to some extent and may serve more users.

As time goes by, even more users in domain 410 and domain 420 may join the watching the movie between steps 9 and 10. Consequently, the content cache server 1 and content cache server 2 may become overloaded. Fortunately, relating to step 5, the user equipment UE-2c may be informed by the internet multimedia system (IMS) that the user equipments UE-2a, UE-2b and UE-2d around the user equipment UE-2c may have some parts of the movie. Thus, the user equipment UE-2c may try to download some parts of the movie from the neighbors via the most appropriate access technology. As a result, the workload of the content cache servers may be relieved to some extent and is able to serve more users.

Internet multimedia system (IMS) user registration, authentication and service discovery may be reused to support the content-on-demand service. Backbone bandwidth consumption and content source server workload may be reduced if peer-to-peer content-on-demand is used because the content may be obtained from multiple sources rather than the central source server. Segmenting and distributing the content in the network helps to reduce the time-to-market of content-of-demand service since the segments of a video content are smaller and can be downloaded to the cache servers more quickly. Similar peer-to-peer content-of-demand service may be provided as well for live video streams, for example.

Figure 4B:
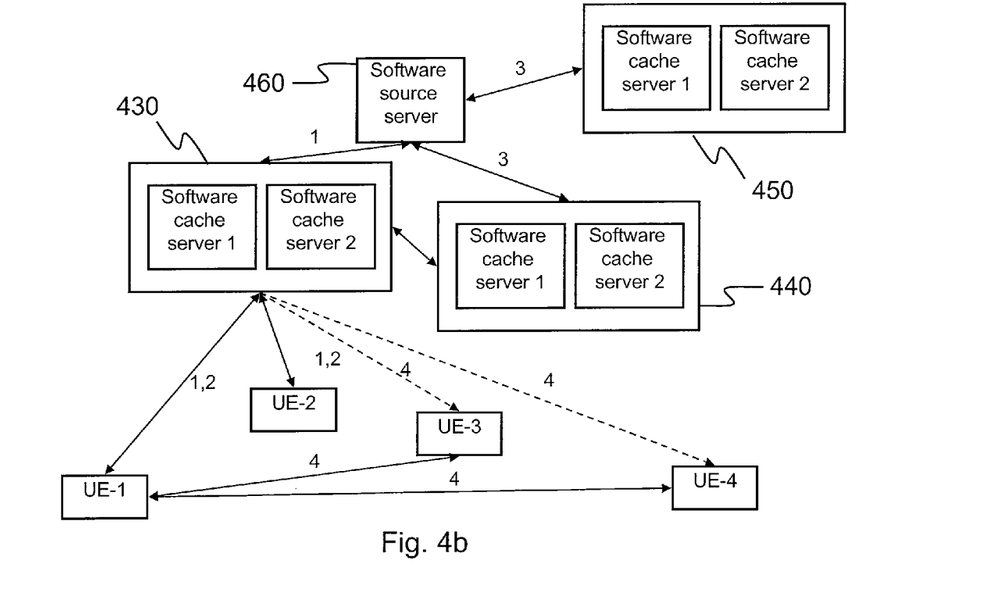
FIG. 4b shows some details of a content-on-demand software download service of an internet multimedia system (IMS), in which various embodiments of the invention may be applied.

FIG. 4b shows some details of another content-on-demand service of an internet multimedia system (IMS), in which various embodiments of the invention may be applied. Operator A may run an internet multimedia system (IMS) network with a large number of subscribers. A critical software bug in internet multimedia system (IMS) client software may have been identified and a software patch needs to be distributed to every user as quickly as possible. Otherwise, the software defect might bring potential serious security issues. Since the end users are geographically distributed in the network, the whole network is divided into different domains 430 to 450 and software cache servers close to the end users in each domain have been deployed in order to reduce download time and lower cross-network traffic.

At step 1, user equipments UE-1 and UE-2 may request to upgrade their internet multimedia system (IMS) client software or the network might force to upgrade their internet multimedia system (IMS) client software. In both cases, a software patch from a software source server 460 is distributed into software cache servers in that domain.

At step 2, the software patch is delivered to the user equipments UE-1 and UE-2 from the software cache servers of domain 430. As more software cache servers 440 to 450 request to cache the software patch from the software source server 460 at step 3, the software source server might get congested. Thus, the cache server might choose to download at least parts of the software patch from the domains that already cache the software patch. In case the software patch is too large, it will be segmented into parts in a fixed length (e.g. 1M bytes).

At step 4, user equipments UE-3 and UE-4 in the same domain 430 may request to download the software patch and the software cache servers of domain 430 might get congested. Since user equipment UE-1 has already cached at least some parts of the software patch, the user equipment UE-1 can provide at least such parts of the software patch to the user equipments UE-3 and UE-4.

Peer-to-peer (P2P) security mode may generate an addition of device features allowing streaming services in areas, where for return-of-investment reasons streaming service would not be possible.

For example in developing markets, there are larger cities, where many inhabitants live in a small area. A mobile network operator may provide a streaming or content server in areas with high population. For areas with low population, other means of content distribution may have to be found requiring less investment by the operator. Peer-to-peer (P2P) content sharing may be used in such areas. Peer-to-peer (P2P) service in accordance with an embodiment of the invention may ensure providing missing content when the user equipment (UE) has got out of reach of the content-on-demand service. Furthermore, peer-to-peer (P2P) service in accordance with an embodiment of the invention may provide a verification system encouraging the peers to help others. The receiving entity and the sending entity may generate a "bonus-ticket", verification information, or an incentive for peer-to-peer (P2P) service. Furthermore, existing streaming and broadcast security keys may be used for the correctness of the "bonus-ticket", verification information, or the incentive. The "bonus-ticket", the verification information, or the incentive may then be redeemed at the operator for example against air-time, free messages, free downloads or some other added value for the user. The "bonus-ticket", the verification information, or the incentive may also be used to charge the consuming device.

In accordance with an example embodiment of the invention, a system for a peer-to-peer (P2P) verification encouraging users to share the content available on their devices is provided. The peer-to-peer (P2P) verification system may allow the network server not being reachable and performing the transfer of content without support of a tracking server. The system may also ensure the correctness of the shared content and avoid some fraud scenarios. The peer-to-peer (P2P) verification system may ensure that only the user having shared content will receive verification or an incentive. The system may also prevent a situation, where a user shares the same piece of content repeatedly for getting verifications or incentives. Furthermore, the verification may be provided only in case the receiving entity consumes the shared content.

In accordance with an example embodiment of the invention, a user may be first located in an urban environment in which the user may have received content distribution, for example multimedia, software or live stream. Later on, the user may have moved to a rural area with no or little connectivity. However, the user may share the earlier received content with other users. The peer-to-peer (P2P) network may use the existing streaming keys in a secure manner for a verification information system. The verification information or the verification tickets may be presented later for the mobile network operator to gain some form of benefit.

Figure 7:
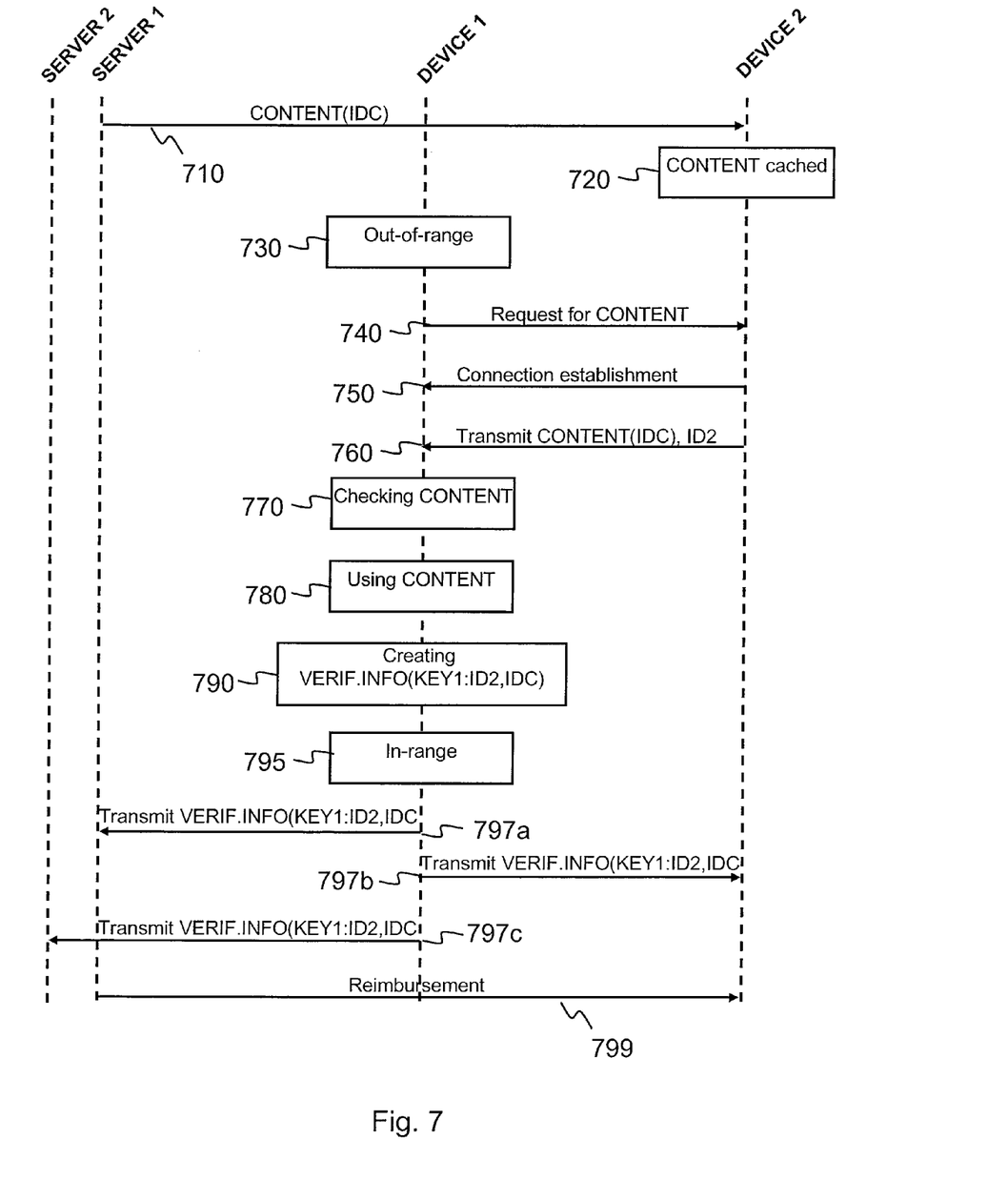
FIG. 7 shows different phases of the peer-to-peer service session operations in an apparatus in accordance with an example embodiment of the invention.

FIG. 7 shows different phases of the peer-to-peer service session operations in an apparatus in accordance with an example embodiment of the invention. A user1 of a device1 is moving out of the full-covered city area potentially for a longer time in step 730. Outside of a coverage area, the user1 is close to a device2 of a user2. The user2 of the device2 has earlier downloaded content 710 from a server1, for example a multimedia stream, and stored 720 the content in the device2. Server1 may be any content providing server.

Getting out of range may correspond to getting out of range of a so-called tracker. The tracker may be a part of the internet multimedia system (IMS) subsystem 162 of FIG. 1 and may keep track of registered devices and available contents in devices. The tracker may also contain information of the sharing-capabilities of the devices, for example connectivity information of wireless local area network (WLAN) or Bluetooth™. Such information may be delivered to the devices for enhancing the peer-to-peer (P2P) service.

In general, a user may cache and store data of the content distribution received from an edge server. An edge server is a service server that is located on the boundary of the coverage area. The data packets from edge servers are signed by the operator. All registered devices for a particular operator may have the operator public key.

In accordance with an example embodiment of the invention, the device1 has a device1 specific symmetric key, which is stored in a secure environment. The symmetric key may be protected by an operating system or trusted environment m-shield, for example. The symmetric key may originate from the streaming application, the cellular system or the generic bootstrapping architecture (GBA) network application function (NAF) of the broadcast-multicast service centre (BM-SC) 153 of FIG. 1. The symmetric key of the device 1 is also known by the operator.

After moving out of range 730, the device1 may no longer obtain the tracking information for other devices. The device1 may then post a request for missing content 740. Such request may be broadcasted at least to device2 and not sent to the tracker server, if such server is out of reach. In case such server is reachable (e.g. if network connection exist) the information about the device2 may come from the tracker server. The request may also be directly sent to the device2, if the device1 has the information about the device2.

In accordance with an example embodiment of the invention, the device2 may receive the request 740 and establish a connection 750 to the device1. After connection establishment, the device 2 may send the available data 760 together with a non-forgeable identity (ID2) allowing the operator to verify the identity of the device2 (e.g. using device certificate, GBA keys or user keys that were used as a baseline for the security hierarchy in the streaming application). The identity may be a key identifier, a signed content identifier (IDC) or similar. Additionally, the device2 may send a credential reflecting success of the device2 in earlier content sharing. The device2 may further download some additional content from network for the device1, in case of the device2 has a network access.

After receiving the content, the device1 may check the content 770. Such checking 770 may comprise checking the operator signature of the content before processing the content data further. The device1 may also check the credential of the content if such mark is available in the content. If both checks are successful and satisfactory, the device1 may proceed.

Next, the device1 may hand over the encrypted content and some additional data to a rendering application for processing the content 780. Processing of the content 780 may comprise at least decrypting the content and rendering the decrypted content in the device1. Such rendering application may also play a video stream of the received content for the user1 of the device1, for example.

In accordance with an example embodiment of the invention, verification information or verification ticket is created 790 for the device2, when the content is consumed by the device1. The verification information creation may be done by the rendering application or by some other protected application of the device1. Such verification information may be created only if the device1 really uses and consumes the data. Encryption of the verification information may be done using a user streaming specific key (KEY1) of the device1, for example a user specific multimedia broadcast multicast service (MBMS) or open mobile alliance broadcast (OMA BOAST) key. The verification information may contain at least an identifier (ID2) of the device2 and a content identifier (IDC). Including the content identifier (IDC) may reduce the fraud use of creating fake verification information between friends. Including the identifier (ID2) of the sharing entity may ensure that the device2 really has been the sharing entity over the peer-to-peer (P2P) communication link.

After receiving content over peer-to-peer (P2P) communication link when being out or range, the device1 may move and become in range 795 again. Such change may be triggered by geographical position change, end of network failure, load balancing or user based device operations. Going out of range 730 may have been triggered due to the user switching off the cellular network access due high data transfer prices, for example.

The verification information 797a to 797c may be sent in different ways. One option is to send the verification information 797a by the device1 to the server1, when becoming in range again. The server1 does not need to be the content server originally transmitting the content to the device2 but the verification information 797c may also be sent to another server, namely server2. The server 2 may be, for example, a billing server. Alternatively, the verification information 797b may be sent directly to the device2. Verification information 797a to 797c may be sent individually or as a bulk comprising multiple tickets. Target for the verification information sending may depend on the compensation mechanism for the verification information or the verification ticket. In case of sending the verification information to server, the device2 may be reimbursed 799 and potentially a credential is given to the device2. Such credential may be signed by the operator. A credential counter may generate the credentials given to a particular device or user. The credential counter needs to be protected for example by an operator signature against modification. The credential counter information may be stored and updated in internet multimedia system (IMS) subsystem 162 of FIG. 1 or in the devices. The verification information provided may be used for billing purposes of the device sharing the content.

In accordance with an example embodiment of the invention, a first entity may use content shared by a second entity. The first entity may be billed for the received content and the second entity may receive a reimbursement based on the verification of the shared content. Furthermore, the second entity may receive a credential for the verified sharing of the content.

In accordance with an example embodiment of the invention, an entity may comprise user equipment (UE), an electronic device, a personal digital assistant (PDA), a laptop computer, a desktop computer or a server, for example. The server may further comprise a content server, a cache server, an edge server or any operator server, for example.

Figure 5:
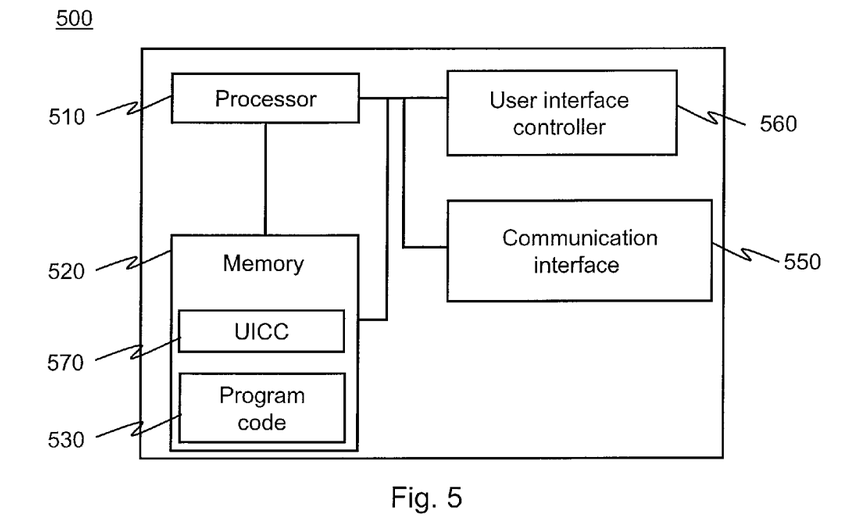
FIG. 5 presents an example block diagram of an apparatus in which various embodiments of the invention may be applied.

FIG. 5 presents an example block diagram of an apparatus 500 in which various embodiments of the invention may be applied. This may be a user equipment (UE), user device or apparatus, such as a mobile terminal or other communication device.

The general structure of the apparatus 500 comprises a communication interface module 550, a processor 510 coupled to the communication interface module 550, and a memory 520 coupled to the processor 510. The apparatus further comprises software 530 stored in the memory 520 and operable to be loaded into and executed in the processor 510. The software 530 may comprise one or more software modules and can be in the form of a computer program product. The apparatus 500 further comprises a user interface controller 560 coupled to the processor 510.

The communication interface module 550 implements at least part of the user data radio discussed in connection with various embodiments of the invention. The communication interface module 550 may be, e.g., a radio interface module, such as a WLAN, Bluetooth, GSM/GPRS, CDMA, WCDMA, or LTE (Long Term Evolution) radio module. The communication interface module 550 may be integrated into the apparatus 500 or into an adapter, card or the like that may be inserted into a suitable slot or port of the apparatus 500. The communication interface module 550 may support one radio interface technology or a plurality of technologies. FIG. 5 shows one communication interface module 550, but the apparatus 500 may comprise a plurality of communication interface modules 550.

The processor 510 may be, e.g., a central processing unit (CPU), a microprocessor, a digital signal processor (DSP), a graphics processing unit, or the like. FIG. 5 shows one processor 510, but the apparatus 500 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 500 may comprise a plurality of memories. The memory 520 may be constructed as a part of the apparatus 500 or it may be inserted into a slot, port, or the like of the apparatus 500 by a user. The memory 520 may serve the sole purpose of storing data, or it may be constructed as a part of an apparatus serving other purposes, such as processing data.

A universal integrated circuit card (UICC) 570 may be included as a smart card used in the apparatus 500. The universal integrated circuit card (UICC) 570 ensures the integrity and security of certain personal data. The universal integrated circuit card (UICC) 570 may contain its unique serial number, internationally unique number of the mobile user (IMSI), security authentication and ciphering information, temporary information related to the local network, a list of the services the user has access to and passwords (PIN for usual use and PUK for unlocking). The universal integrated circuit card (UICC) 570 may further comprise several applications, making it possible for the same smart card to give access to different networks, and provide storage of a phone book and other applications. The system may utilize an embedded security module for the key storage and processing.

The user interface controller 560 may comprise circuitry for receiving input from a user of the apparatus 500, e.g., via a keyboard, graphical user interface shown on the display of the apparatus 500, speech recognition circuitry, or an accessory device, such as a headset, and for providing output to the user via, e.g., a graphical user interface or a loudspeaker.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available.

Figure 6:
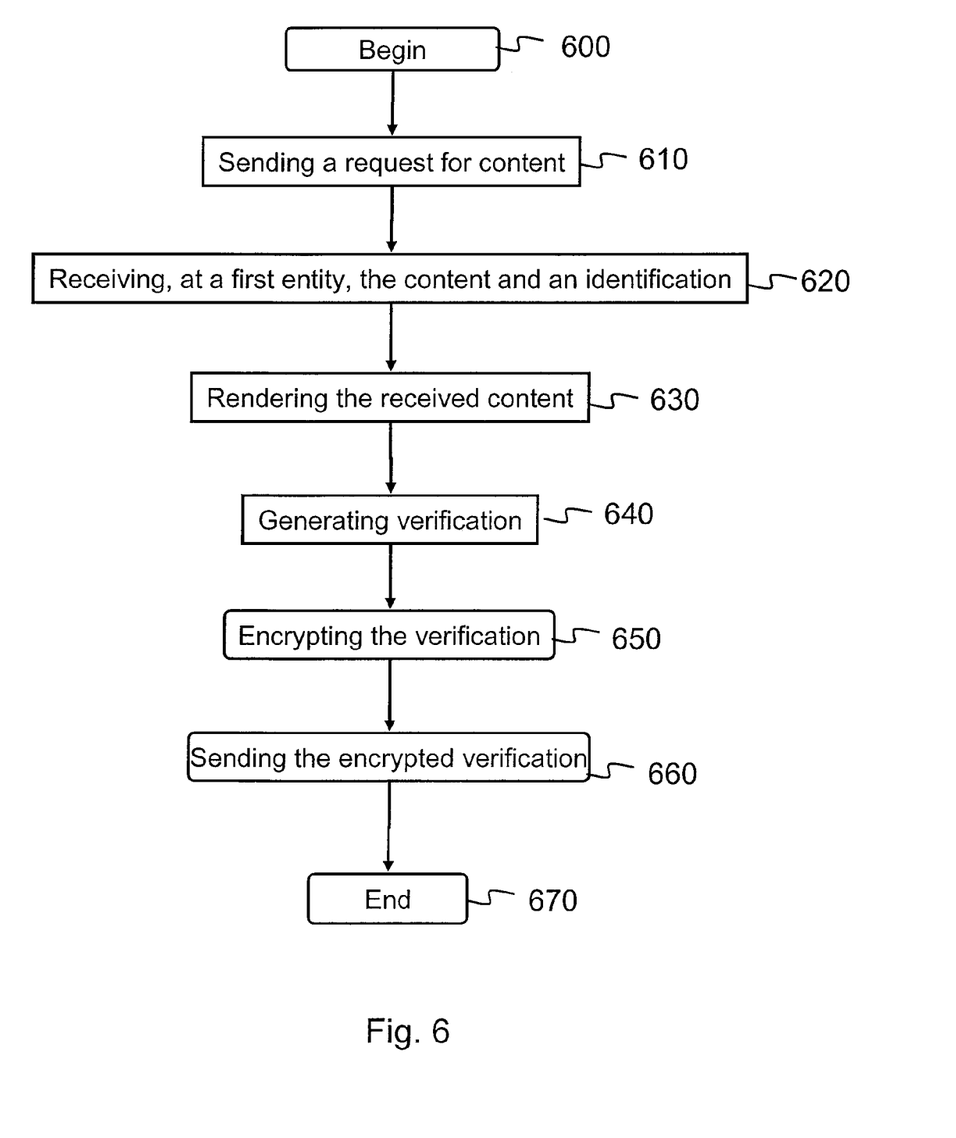
FIG. 6 shows a flow diagram showing peer-to-peer service session operations in an apparatus in accordance with an example embodiment of the invention.

FIG. 6 shows a flow diagram showing peer-to-peer service session operations in an apparatus in accordance with an example embodiment of the invention. In step 600, the method is started. In step 610, an optional request for content is sent by a first entity. In step 620, the content and an identification of the second entity is received. In step 630, the received content is rendered. In step 640, verification information is generated by the first entity and such verification information is encrypted in step 650. In step 660, the encrypted verification information is sent. The method ends in step 670.

The deployment of expensive streaming services in sparsely populated areas may not be efficient for a network operator. However, such areas should also be covered by the service infrastructure. An embodiment of the invention presents a method to extend the existing network technology to enable and support direct user equipment (UE) interaction to provide media services in such areas.

A similar technology has been adopted by the Open Mobile Alliance (OMA) in their OMA Broadcast (OMA BCAST) specifications. Their security model and key hierarchy are analogous to the multimedia broadcast/multicast service (MBMS) security architecture. Thus, the embodiments of the invention also apply to the Open Mobile Alliance (OMA) environment, digital video broadcasting—handheld (DVB-H) and top-up boxes.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
   determining, by a first entity, that the first entity is out of a network coverage area of a multimedia broadcast/multicast service that provides content of interest to the first entity;
   sending, by the first entity, in response to the determining, a request for the content to a second entity over a peer-to-peer communication link, wherein the content was previously requested and received by the second entity from the multimedia broadcast/multicast service for rendering by the second entity;
   receiving, at the first entity, directly from the second entity, the content and an identification of the second entity, over the peer-to-peer communication link, the identification of the second entity being at least one of the following multimedia broadcast/multicast service keys: user key, request key, service key or traffic key;
   rendering, at the first entity, the received content;
   generating, at the first entity, in response to the received content having been successfully rendered at the first entity, verification information containing at least:
   the identification of the second entity; and
   an identification of the received content;
   encrypting, at the first entity, the verification information using an encryption key; and
   sending, by the first entity, the encrypted verification information to one of an operator or the second entity for verification of the content transfer and usage.

2. The method of claim 1, further comprising:
   checking, at the first entity, a credential of the second entity from the content before rendering the content.

3. The method of claim 1, further comprising:
   checking, at the first entity, an operator signature of the content before rendering the content.

4. The method of claim 1, further comprising signing the content using a signature, when the content is created by an operator.

5. The method of claim 4, wherein the signature is a public key of the operator.

6. The method of claim 1, wherein the encryption key is a first entity specific symmetric key.

7. The method of claim 6, wherein the first entity specific symmetric key is at least one of the following multimedia broadcast/multicast service keys: user key, request key, service key and traffic key.

8. The method of claim 1, further comprising:
   receiving the content, at the second entity, from a content server of an operator before sending the content to the first entity.

9. The method of claim 1, further comprising:
   providing a credential for the second entity.

10. The method of claim 9, further comprising:
    generating a credential value for the second entity and including the credential value, at the second entity, to the content sent to the first entity.

11. The method of claim 10, further comprising:
    signing the generated credential value using an operator signature.

12. The method of claim 7, wherein the user key is derived from a ciphering key and an integrity key.

13. The method of claim 1, wherein the content comprises at least one of the following: multimedia information, file download, real-time streaming data or software.

14. An apparatus comprising:
    at least one processor; and
    at least one memory including computer program code, the at least one memory and the computer program code being configured to, with the at least one processor, cause the apparatus at least to:
    determine, by a first entity, that the first entity is out of a network coverage area of a multimedia broadcast/multicast service that provides content of interest to the first entity;
    send, by the first entity, in response to the determining, a request for the content to a second entity over a peer-to-peer communication link, wherein the content was previously requested and received by the second entity from the multimedia broadcast/multicast service for rendering by the second entity;
    receive, at the first entity, directly from the second entity, the content and an identification of the second entity, over the peer-to-peer communication link, the identification of the second entity being at least one of the following multimedia broadcast/multicast service keys: user key, request key, service key or traffic key;
    render, at the first entity, the received content;
    generate, at the first entity, verification information, in response to the received content having been successfully rendered at the first entity, the verification information containing at least:
    the identification of the second entity; and
    an identification of the received content;
    encrypt, at the first entity, the verification information using an encryption key; and
    sending, by the first entity, the encrypted verification information to one of an operator or the second entity for verification of the content transfer and usage.

15. The apparatus of claim 14, wherein the at least one memory and the computer program code are configured to, with the at least one processor, cause the apparatus to further perform:
    check a credential value of the second entity from the content before rendering the content.

16. The apparatus of claim 14, wherein the at least one memory and the computer program code are configured to, with the at least one processor, cause the apparatus to further perform:
    check an operator signature of the content before rendering the content.

17. The apparatus of claim 14, wherein the encryption key is an apparatus specific symmetric key.

18. The apparatus of claim 17, wherein the apparatus specific symmetric key is at least one of the following multimedia broadcast/multicast service keys: user key, request key, service key or traffic key.

19. The apparatus of claim 14, wherein the content comprises at least one of the following: multimedia information, file download, real-time streaming data or software.

20. A computer program embodied on a computer readable non-transitory medium comprising computer executable program code which, when executed by at least one processor of an apparatus, causes the apparatus to:
- determine, by a first entity, that the first entity is out of a network coverage area of a multimedia broadcast/multicast service that provides content of interest to the first entity;
- send, by the first entity, in response to the determining, a request for the content to a second entity over a peer-to-peer communication link, wherein the content was previously requested and received by the second entity from the multimedia broadcast/multicast service for rendering by the second entity;
- receive, at the first entity, directly from the second entity, the content and an identification of the second entity, over the peer-to-peer communication link, the identification of the second entity being at least one of the following multimedia broadcast/multicast service keys: user key, request key, service key or traffic key;
- render, at the first entity, the received content;
- generate, at the first entity, in response to the received content having been successfully rendered at the first entity, verification information containing at least:
  - the identification of the second entity; and
  - an identification of the received content;
- encrypt, at the first entity, the verification information using an encryption key; and
- sending, by the first entity, the encrypted verification information to one of an operator or the second entity for verification of the content transfer and usage.

21. An apparatus comprising:
at least one processor; and
at least one memory including computer program code, the at least one memory and the computer program code being configured to, with the at least one processor, cause the apparatus at least to:
- receive, by a first entity, from a multimedia broadcast/multicast service, a first portion of content requested by the first entity;
- determine, by the first entity, that the first entity is out of a network coverage area of the multimedia broadcast/multicast service that provided the first portion of the content to the first entity;
- sending, by the first entity, in response to the determining, a request for a second portion of the content to a second entity over a peer-to-peer communication link, wherein the second portion of the content was previously requested and received by the second entity from the multimedia broadcast/multicast service for rendering by the second entity;
- receiving, at the first entity, directly from the second entity, the second portion of the content and an identification of the second entity, over the peer-to-peer communication link, the identification of the second entity being at least one of the following multimedia broadcast/multicast service keys: user key, request key, service key or traffic key;
- rendering, at the first entity, the second portion of the received content;
- generating, at the first entity, in response to the rendering of the second portion of the received content having been successfully rendered at the first entity, verification information containing at least:
  - the identification of the second entity; and
  - an identification of the second portion of the received content;
- encrypting, at the first entity, the verification information using an encryption key; and
- sending, by the first entity, the encrypted verification information to one of an operator or the second entity for verification of the content transfer and usage.

* * * * *